US009606356B2

(12) United States Patent
Shin

(10) Patent No.: US 9,606,356 B2
(45) Date of Patent: Mar. 28, 2017

(54) POSITIONING MODULE FOR HEAD-UP DISPLAY DEVICE

(71) Applicant: HYUNDAI MOBIS CO., LTD., Seoul (KR)

(72) Inventor: Yu Jin Shin, Yongin (KR)

(73) Assignee: HYUNDAI MOBIS CO., LTD, Seoul (KR)

( * ) Notice: Subject to any disclaimer, the term of this patent is extended or adjusted under 35 U.S.C. 154(b) by 0 days.

(21) Appl. No.: 14/752,581

(22) Filed: Jun. 26, 2015

(65) Prior Publication Data
US 2016/0139410 A1 May 19, 2016

(30) Foreign Application Priority Data
Nov. 19, 2014 (KR) .................. 10-2014-0161792

(51) Int. Cl.
G02B 27/14 (2006.01)
G02B 27/01 (2006.01)

(52) U.S. Cl.
CPC ..... G02B 27/0149 (2013.01); G02B 27/0179 (2013.01); G02B 2027/0159 (2013.01); G02B 2027/0163 (2013.01)

(58) Field of Classification Search
CPC ............ G02B 27/0149; G02B 27/0179; G02B 2027/0163; G02B 2027/0159
See application file for complete search history.

(56) References Cited

U.S. PATENT DOCUMENTS

2011/0061482 A1* 3/2011 Maruyama .......... F16H 25/2015
74/89.23

FOREIGN PATENT DOCUMENTS

KR 10-2011-0010730 A 2/2011

* cited by examiner

Primary Examiner — Alicia M Harrington

(57) ABSTRACT

The present invention provides a positioning module for a head-up display device, including: a positioning motor which is operated by an operating signal from a control unit; a lead screw which is connected with the positioning motor and rotated by an operation of the positioning motor; a movable link which is in threaded engagement with the lead screw and moved in an axial direction of the lead screw by the rotation of the lead screw; and a connecting member which connects a mirror unit, which is provided to be rotatable about a rotating shaft, with the movable link, and rotates the mirror unit according to the movement of the movable link, in which connection portions between the connecting member and the movable link are in surface contact with each other, thereby improving durability and positioning performance.

6 Claims, 4 Drawing Sheets

POSITIONING MODULE FOR HEAD-UP DISPLAY DEVICE

CROSS-REFERENCE TO RELATED APPLICATIONS

This application claims priority to and the benefit of Korean Patent Application No. 10-2014-0161792 filed in the Korean Intellectual Property Office on Nov. 19, 2014, the entire contents of which are incorporated herein by reference.

TECHNICAL FIELD

The present invention relates to a positioning module for a head-up display device, and more particularly, to a positioning module for a head-up display device, which serves to drive a mirror unit that reflects light in a head-up display device for a vehicle.

BACKGROUND ART

A head-up display device for a vehicle refers to a device that provides images to a driver by reflecting display light emitted from a display device, which is provided in an instrument panel in the vehicle, toward a front glass of the vehicle.

In general, as disclosed in Patent Literature 1, the head-up display device includes a liquid crystal display device, a first reflector, a second reflector, and a housing.

In the head-up display device, in order to adjust an angle of a concave mirror (mirror unit) of the second reflector, the mirror unit is provided to be rotatable about a rotating shaft, and a positioning module, which transmits power to the mirror unit, is connected to the mirror unit, thereby adjusting the angle of the mirror unit.

However, in the positioning module for a head-up display device in the related art, a power transmission part is in point contact with a portion of a power receiving part and transmits power for rotating the power receiving part, and as a result, there are problems in that external force caused by vibration and friction are concentrated at one point, whereby relatively severe abrasion and deformation may occur, positioning precision deteriorates, and optical performance of a system deteriorates.

LITERATURE OF RELATED ART

Patent Literature (Patent Literature 1) Korean Patent Application Laid-Open No. 2011-0010730

SUMMARY OF THE INVENTION

The present invention has been made in an effort to provide a positioning module for a head-up display device, which has improved durability and positioning performance.

An exemplary embodiment of the present invention provides a positioning module for a head-up display device, including: a positioning motor which is operated by an operating signal from a control unit; a lead screw which is connected with the positioning motor and rotated by an operation of the positioning motor; a movable link which is in threaded engagement with the lead screw and moved in an axial direction of the lead screw by the rotation of the lead screw; and a connecting member which connects a mirror unit, which is provided to be rotatable about a rotating shaft, with the movable link, and rotates the mirror unit according to the movement of the movable link, in which connection portions between the connecting member and the movable link are in line contact with each other.

A protruding portion may protrude from one surface of the movable link, a slot may be formed to penetrate a plate-shaped surface of the protruding portion, one end of the connecting member may be coupled to one surface of the mirror unit, and a protruding pin, which protrudes from one surface of the other end of the connecting member, may be slidably coupled to the slot.

A withdrawal prevention portion, which prevents the protruding pin from being withdrawn from the slot, may be formed at an end of the protruding pin.

A length of the slot may be limited within a range in which the protruding pin slides in the slot according to a rotation range of the mirror unit.

The positioning module for a head-up display device may further include a guide shaft which is provided in parallel with the lead screw, in which a guide hole into which the guide shaft is penetratively inserted is formed in the movable link.

According to the positioning module for a head-up display device of the present invention, durability and positioning performance may be improved.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
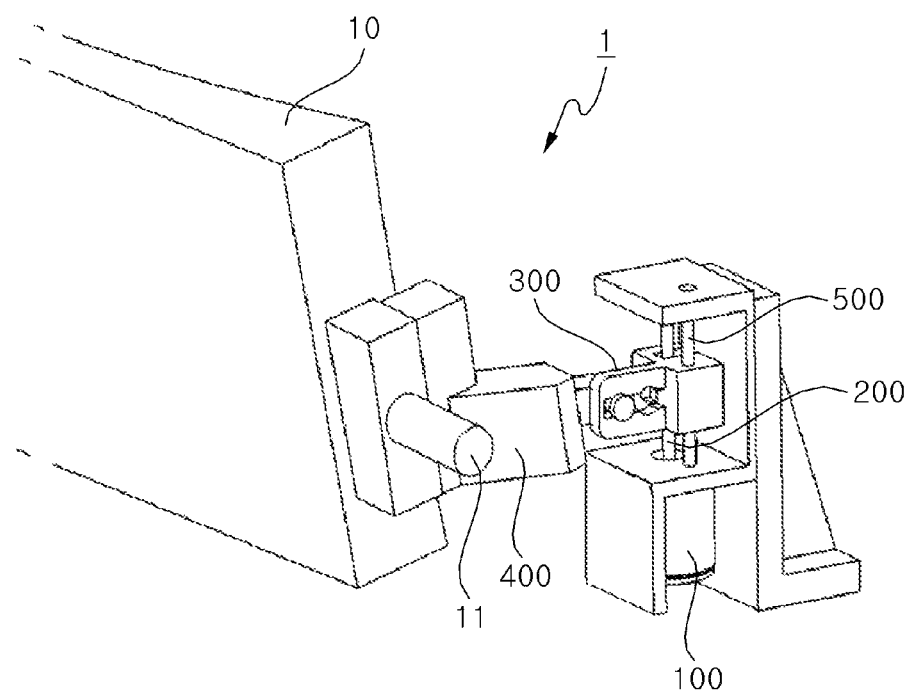
FIG. 1 is a perspective view schematically illustrating a configuration of a positioning module for a head-up display device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, the same constituent elements will be designated by the same reference numerals even though they are shown in different drawings. Further, hereinafter, an exemplary embodiment of the present invention will be described, but it is obvious that the technical spirit of the present invention is not restricted or limited thereto, but the exemplary embodiment of the present invention may be modified by a person with ordinary skill in the art and may be variously carried out.

Figure 2:
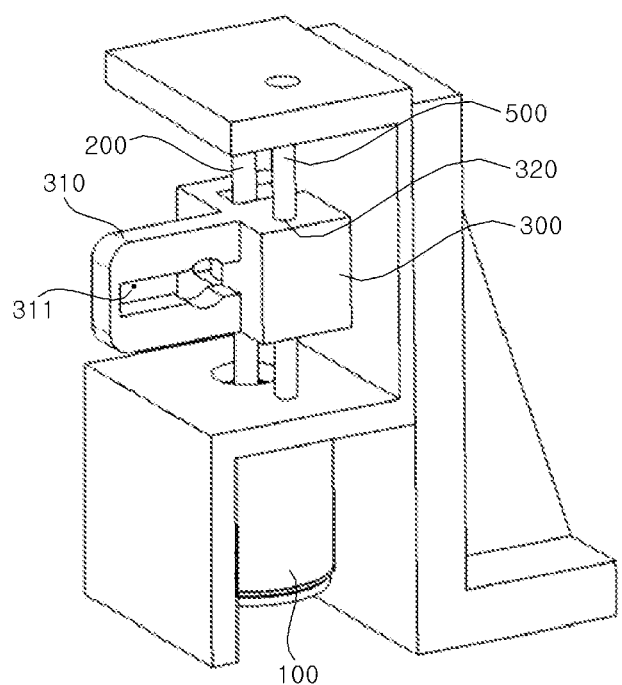
FIG. 2 is an enlarged perspective view illustrating in detail a configuration for connecting a positioning motor and a movable link in FIG. 1.
Figure 3:
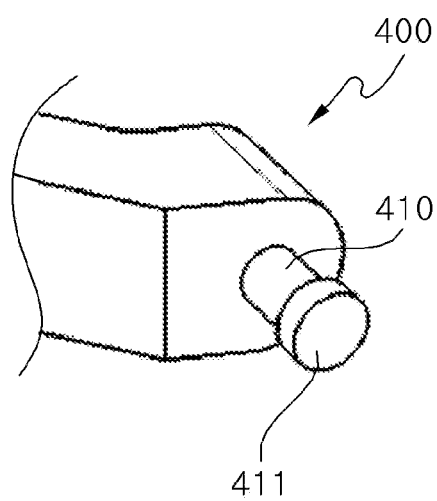
FIG. 3 is an enlarged perspective view illustrating an end of a connecting member in FIG. 1.
Figure 4:
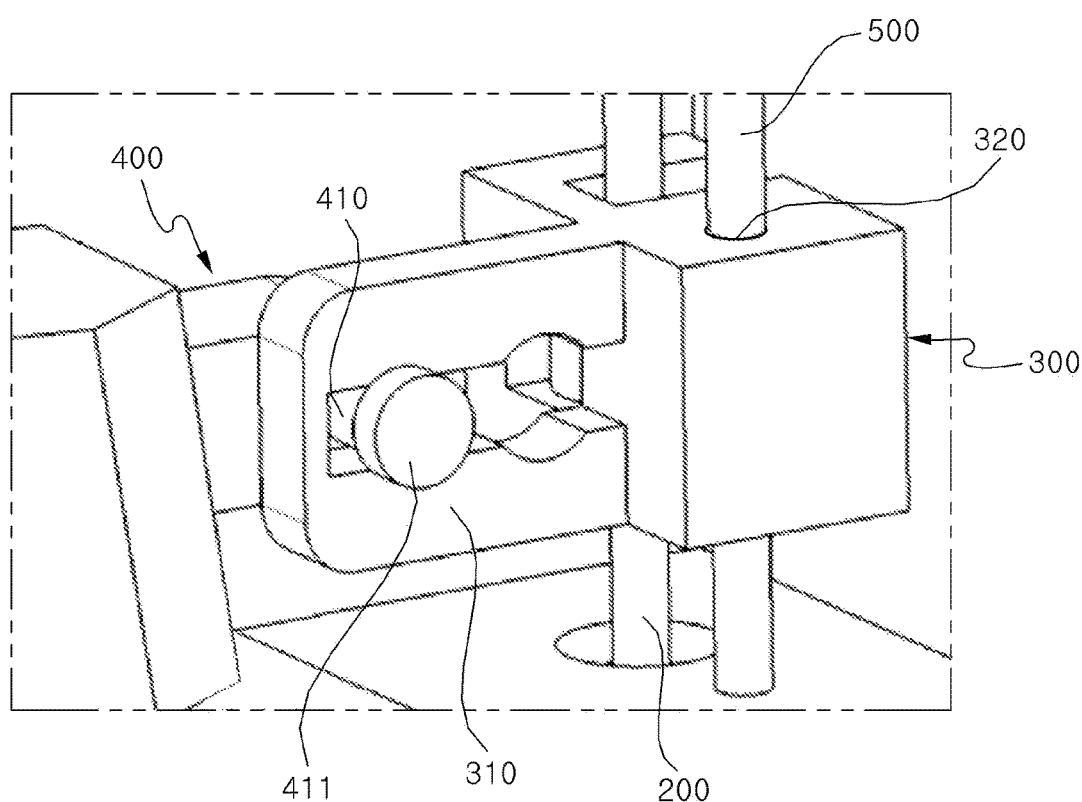
FIG. 4 is an enlarged perspective view illustrating a portion where the movable link and the connecting member in FIG. 1 are connected.
Figure 5:
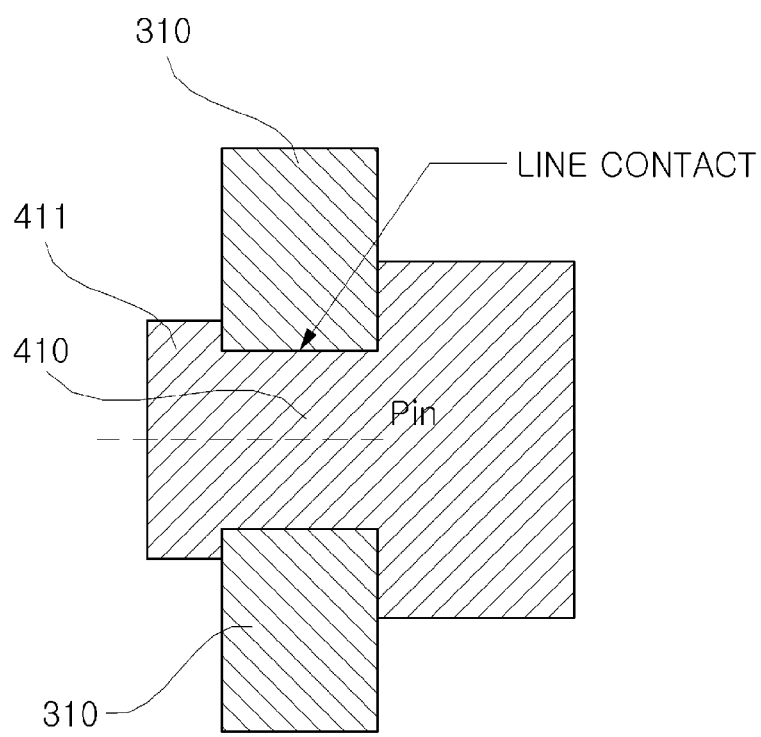
FIG. 5 is a longitudinal cross-sectional view of FIG. 4.

FIG. 1 is a perspective view schematically illustrating a configuration of a positioning module for a head-up display device according to an exemplary embodiment of the present invention, FIG. 2 is an enlarged perspective view illustrating in detail a configuration for connecting a positioning motor and a movable link in FIG. 1, FIG. 3 is an enlarged perspective view illustrating an end of a connecting member in FIG. 1, FIG. 4 is an enlarged perspective view illustrating a portion where the movable link and the connecting member in FIG. 1 are connected, and FIG. 5 is a longitudinal cross-sectional view of FIG. 4.

FIGS. 1 to 5 clearly illustrate only main characteristic parts for conceptual and clear understanding of the present invention. As a result, various modifications to the illustrations are expected, and the scope of the present invention need not be limited to specific shapes illustrated in the drawings.

Referring to FIG. 1, a positioning module 1 for a head-up display device according to an exemplary embodiment of the present invention includes a positioning motor 100 which is operated by an operating signal from a control unit, a lead screw 200 which is connected with the positioning motor 100 and rotated by an operation of the positioning motor 100, a movable link 300 which is in threaded engagement with the lead screw 200 and moved in an axial direction of the lead screw 200 by the rotation of the lead screw 200, and a connecting member 400 which connects a mirror unit 10, which is provided to be rotatable about a rotating shaft 11, with the movable link 300 and rotates the mirror unit 10 according to the movement of the movable link 300.

An operation of the positioning motor 100 is controlled by an operating signal from the control unit, and the positioning motor 100 is configured as a stepping motor.

The lead screw 200 is connected to the positioning motor 100 and rotated by the operation of the positioning motor 100.

The movable link 300 is in threaded engagement with the lead screw 200 and rectilinearly moved in the axial direction of the lead screw 200 by the rotation of the lead screw 200. In addition, referring to FIG. 2, the positioning module 1 for a head-up display device according to the present exemplary embodiment further includes a guide shaft 500 which is provided in parallel with the lead screw 200, and a guide hole 320 into which the guide shaft 500 is penetratively inserted is formed in the movable link 300. That is, the guide shaft 500, which is provided in parallel with the lead screw 200, is inserted into the guide hole 320 of the movable link 300, and guides the movement of the movable link 300, thereby preventing the movable link 300 from rotating.

The connecting member 400 connects the mirror unit 10, which is provided to be rotatable about the rotating shaft 11, with the movable link 300, and allows the mirror unit 10 to be rotated by the movement of the movable link 300.

When specifically describing the interconnection between the movable link 300 and the connecting member 400, as illustrated in FIGS. 1 and 4, a protruding portion 310 protrudes from one surface of the movable link 300, and a slot 311 is formed to penetrate a plate-shaped surface of the protruding portion 310. One end of the connecting member 400 is coupled to one surface of the mirror unit 10, and a protruding pin 410 protrudes from one surface of the other end of the connecting member 400. The protruding pin 410 is slidably coupled to the slot 311 of the protruding portion 310. With the aforementioned configuration, when the movable link 300 is rectilinearly moved in the axial direction of the lead screw 200, the other end of the connecting member 400, which is connected with the movable link 300, is moved in the axial direction of the lead screw 200, whereby the mirror unit 10 is rotated. When the other end of the connecting member 400 is moved together with the movable link 300, the other end of the connecting member 400 is moved in a direction, which intersects with the axial direction of the lead screw 200, as the protruding pin 410 slides in the slot 311.

Referring to FIG. 5, connection portions between the connecting member 400 and the movable link 300, that is, contact portions where the protruding pin 410 is in contact with an inner surface of the slot 311, form a line contact. Therefore, power transmission between the movable link 300 and the connecting member 400 may be stably carried out, and a contact area between the components is increased, thereby improving durability.

Meanwhile, referring to FIGS. 3 and 4, a withdrawal prevention portion 411, which prevents the protruding pin 410 from being withdrawn from the slot 311, is formed at an end of the protruding pin 410. The withdrawal prevention portion 411 is a portion that protrudes at the end of the protruding pin 410 so as to have a size greater than a size of the slot 311, and the withdrawal prevention portion 411 prevents the protruding pin 410 from being withdrawn, and restricts the movement of the connecting member 400 so that the power transmission is more precisely carried out.

A length of the slot 311, which is formed in the protruding portion 310 of the movable link 300, is limited within a range in which the protruding pin 410 slides in the slot 311 according to a rotation range of the mirror unit 10. Accordingly, the mirror unit 10 is prevented from being rotated out of the rotation range.

An operation of the positioning module 1 for a head-up display device, which has the aforementioned configurations, will be described below.

Figure 6:
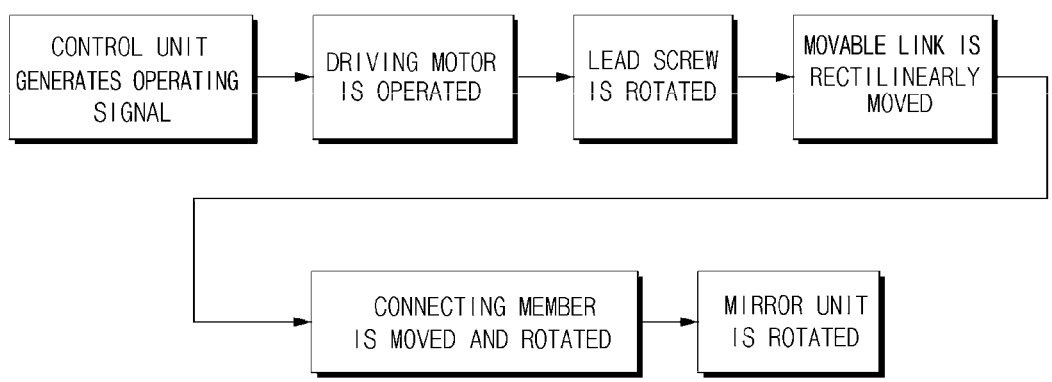
FIG. 6 is a flowchart explaining an operational process of the positioning module for a head-up display device in FIG. 1.

Referring to FIG. 6, when an operating signal is generated by the control unit to cope with a requirement for a rotation position of the mirror unit 10, the positioning motor 100 receives the operating signal from the control unit and rotates.

The lead screw 200, which is connected with the positioning motor 100, is rotated by the operation of the positioning motor 100, and the movable link 300, which is in threaded engagement with the lead screw 200, is rectilinearly moved in the axial direction of the lead screw 200.

When the movable link 300 is rectilinearly moved, the other end of the connecting member 400, which is connected with the movable link 300, is moved in the direction in which the movable link 300 is moved, and the mirror unit 10 is rotated about the rotating shaft 11 by the movement of the connecting member 400.

In this case, the protruding pin 410 of the connecting member 400 and the inner surface of the slot 311 of the movable link 300 are in line contact with each other and transmit power, such that power transmission may be stably carried out, and durability of the components may be improved by dispersing contact pressure.

As described above, according to the positioning module 1 for a head-up display device of the present invention, durability and positioning performance may be improved.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A positioning module for a head-up display device, the positioning module comprising:
    a positioning motor operated by an operating signal from a control unit;
    a lead screw connected to the positioning motor and rotated by an operation of the positioning motor;
    a movable link in threaded engagement with the lead screw and moved in an axial direction of the lead screw by the rotation of the lead screw; and
    a connecting member connecting a mirror unit with the movable link, and rotating the mirror unit about a rotating shaft according to the movement of the movable link,
    wherein connection portions of the connecting member and the movable link are in line contact with each other, wherein a protruding portion protrudes from one surface of the movable link, a slot penetrates a plate-shaped surface of the protruding portion, one end of the connecting member is coupled to one surface of the mirror unit, and a protruding pin, which protrudes from one surface of the other end of the connecting member, is slidably coupled to the slot.

2. The positioning module of claim 1, wherein a withdrawal prevention portion, which prevents the protruding pin from being withdrawn from the slot, is formed at an end of the protruding pin.

3. The positioning module of claim 1, wherein a length of the slot is limited within a range in which the protruding pin slides in the slot according to a rotation range of the mirror unit.

4. The positioning module of claim 1, further comprising:
    a guide shaft which is provided in parallel with the lead screw,
    wherein the movable link includes a guide hole into which the guide shaft is penetratively inserted.

5. A positioning module, comprising:
    a positioning motor operated by an operating signal from a control unit;
    a lead screw connected to the positioning motor and rotated by the positioning motor;
    a movable link threaded with the lead screw and moved in an axial direction by the rotation of the lead screw, the movable link including a protruding portion that is penetrated by a slot; and
    a connecting member rotating a mirror unit about a rotating shaft according to the movement of the movable link, a first end of the connecting member being coupled to a surface of the mirror unit, a protruding pin protruding from a second end of the connecting member, the protruding pin being slidably coupled to the slot of the movable link.

6. The positioning module of claim 5, wherein the protruding pin includes a withdrawal prevention portion having a greater size than the slot.

\* \* \* \* \*